United States Patent
Sakaguchi et al.

(10) Patent No.: US 7,929,191 B2
(45) Date of Patent: Apr. 19, 2011

(54) SPATIAL LIGHT MODULATOR AND LIGHT SENSING DEVICE PROVIDED ON THE SAME SUBSTRATE

(75) Inventors: Kiyofumi Sakaguchi, Kanagawa-ken (JP); Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 11/563,391

(22) Filed: Nov. 27, 2006

(65) Prior Publication Data

US 2007/0146847 A1    Jun. 28, 2007

(30) Foreign Application Priority Data

Nov. 29, 2005 (JP) .................. 2005-344377

(51) Int. Cl.
*G03H 1/04* (2006.01)
*G11B 7/00* (2006.01)

(52) U.S. Cl. ......................... 359/35; 369/102
(58) Field of Classification Search .............. 359/29, 359/1, 10–11, 21–26, 32, 35; 345/173, 175; 369/102–103, 112.01, 112.16, 120

See application file for complete search history.

(56) References Cited

U.S. PATENT DOCUMENTS

| | | | |
|---|---|---|---|
| 6,243,155 B1 * | 6/2001 | Zhang et al. | 349/199 |
| 6,747,638 B2 * | 6/2004 | Yamazaki et al. | 345/207 |
| 7,092,133 B2 | 8/2006 | Anderson et al. | |
| 7,167,286 B2 | 1/2007 | Anderson et al. | |
| 7,227,540 B2 | 6/2007 | Murayama et al. | |
| 2004/0179251 A1 | 9/2004 | Anderson et al. | |
| 2006/0176799 A1 * | 8/2006 | Hirono | 369/103 |
| 2006/0238841 A1 | 10/2006 | Anderson et al. | |
| 2007/0147215 A1 * | 6/2007 | Sakaguchi et al. | 369/103 |
| 2008/0192311 A1 | 8/2008 | Horimai | |

FOREIGN PATENT DOCUMENTS

| | | |
|---|---|---|
| JP | 2003-315692 A | 11/2003 |
| JP | 2004-272268 A | 9/2004 |
| WO | 2004/102542 A1 | 11/2004 |

OTHER PUBLICATIONS

Hirogome, Hideyoshi, et al. "Holographic Medica Close to Takeoff, Realize 200 GB in 2006," Nikkei Electronics, No. 891, Jan. 17, 2005, pp. 105-114, with English translation.

Japanese Office Action dated May 26, 2010, issued in counterpart Japanese patent application No. 2005-344377, with an English translation.

* cited by examiner

*Primary Examiner* — Brian M. Healy
*Assistant Examiner* — Charles Chang
(74) *Attorney, Agent, or Firm* — Fitzpatrick, Cella, Harper & Scinto (57) ABSTRACT

A holographic memory system includes a spatial light modulator having multiple modulators for spatially modulating at least a portion of a light beam emitted from a light source and rendering it as an information light beam, and a light sensing device for reading the information light beam taken out of a recording medium. The spatial light modulator and the light sensing device are integrally formed on the same substrate.

11 Claims, 7 Drawing Sheets

SPATIAL LIGHT MODULATOR AND LIGHT SENSING DEVICE PROVIDED ON THE SAME SUBSTRATE

This application claims the benefit of Japanese Patent Application No. 2005-344377, filed Nov. 29, 2005, which is hereby incorporated by reference herein in its entirety.

BACKGROUND OF THE INVENTION

1. Field of the Invention

The present invention relates to a modulation/light sensing device capable of high-density and large-volume recording and reproduction of information by recording interference fringes of light on a recording medium, which device is used in an optical information recording and reproducing apparatus using a hologram.

2. Description of the Related Art

The world is in a multimedia age today, and there has been an increasingly greater necessity for a recording apparatus for performing recording on a recording medium and a recording and reproducing apparatus for performing recording of information on and reproduction of information from the recording medium, and the recording density thereof is also rising year after year. As for optical information recording media, progress has been made from a CD (Compact Disc) to a DVD (Digital Versatile Disc) and then to a Blue-ray disc. In response to the progress in the optical information recording media, the recording density is also increased by using shorter-wavelength light as to an optical information recording apparatus and an optical information recording and reproducing apparatus. In recent years, a new recording method, called a holographic memory, has been proposed. The holographic memory records information by forming holograms according to the information to be recorded in the recording medium. It is capable of multiple recording due to a characteristic of using the holograms, in which the information is reproducible independently from the holograms, even if adjacent holograms have mutually overlapping portions. Therefore, the holographic memory can attain a high recording density that is not obtainable by a conventional optical information recording medium.

The holographic memory is described, for example, in "Holographic Media Close to Takeoff, Realize 200 GB in 2006" by Hideyoshi Horigome, et al., pages 105 to 114, Nikkei Electronics, No. 891, Jan. 17, 2005. This article discloses a recording and reproducing apparatus based on the holographic memory using a two-dimensional spatial light modulator and a light sensing device. This article also describes an optical system of a coaxial type holographic memory system (optical information recording and reproducing apparatus) called a collinear system.

After all, the optical information recording and reproducing apparatus develops the information to be recorded as two-dimensional digital pattern information, and an information light beam is modulated by the two-dimensional digital pattern information. This process generates an information light beam wherein recording information has become light intensity distribution image information of two-dimensional space. And, it lets the information light beam and a reference light beam interfere so as to record interference fringes thereof on the recording medium. With regard to reproduction, it extracts and decodes the two-dimensional digital pattern information from the light intensity distribution image information reproduced by irradiating the reference light beam on the recording medium. It is possible, by this digital process, to suppress lowering of a reproduction error rate due to degradation of an S/N ratio, and to correct an error by encoding binary data, so as to reproduce the recording information extremely faithfully.

The above-mentioned collinear holographic memory system has a coaxial optical arrangement in which the information light beam and the reference light beam have no angle, so that recording and reproduction can be performed by using one objective. For that reason, there is an advantage that the optical system becomes simple, in comparison with a biaxial two-beam interference method of irradiating the information light beam and the reference light beam on the recording medium from different optical paths. There is also an advantage that the optical system can be placed on one surface side of a disk-like recording medium, because of a structure of the recording medium having a reflective film.

SUMMARY OF THE INVENTION

As for the above-mentioned conventional holographic memory system, however, it is necessary to align a two-dimensional spatial light modulator and a light sensing device by controlling a shift (displacement), a tilt (inclination) and a rotation (turning angle) between them with high precision. Therefore, cost reduction is difficult.

Another object of the present invention is to provide a device used for modulation and reception of an information light beam in such an optical information recording and reproducing apparatus.

The device of the present invention is a device for modulating light from a light source and for receiving light incident from outside. The device includes a spatial light modulator for spatially modulating at least a portion of a first light beam, for example, a light beam emitted from the light source and a light sensing device for receiving a second light beam, for example, the light incident from outside. Here, the spatial light modulator and the light sensing device are integrally provided on the same substrate.

As for positional relations between the spatial light modulator and the light sensing device according to the present invention, the spatial light modulator and the light sensing device may be longitudinally arranged and laterally arranged on the same substrate. In the case of arranging them longitudinally, the spatial light modulator and the light sensing device are stacked to have the spatial light modulator placed on the light source side, and a pixel pitch of the spatial light modulator matches with the pixel pitch of the light sensing device, so that a pixel of the spatial light modulator and a corresponding pixel of the light sensing device are arranged along an optical axis of the light incident from the light source to transmit at least a portion of the light incident on the spatial light modulator toward the light sensing device. In this case, it is desirable that modulation setup is possible as to the spatial light modulator, so that each of the pixels has a constant transmittance to the light sensing device. In comparison, in the case of arranging them laterally, the spatial light modulator and the light sensing device are placed adjacent to each other, so that the pixel of the spatial light modulator and the corresponding pixel of the light sensing device do not overlap along the optical axis of the light incident from the light source.

As for the above-mentioned service and the optical information recording and reproducing apparatus using it, according to the present invention, it is desirable to use a device of which a reflected light intensity changes according to a modulation signal as the spatial light modulator. Such a spatial light modulator is a device including a light reflection electrode for reflecting the light from the light source and a semi-transparent film placed further on the light source side than the light reflection electrode, via space, and showing semi-transparency to the light from the light source. The device changes a reflectance of the light from the light source by controlling a distance between the light reflection electrode and the semi-transparent film. The spatial light modulator is also a reflective liquid crystal device. According to the present invention, it is desirable to use a silicon semiconductor substrate as the substrate.

Conventionally, the spatial light modulator and the light sensing device are separately provided as chips by a silicon press. According to the present invention, however, it is possible to reduce the number of such silicon semiconductor chips by half, that is, from two pieces to one piece. The spatial light modulator and the light sensing device undergo almost the same steps of a semiconductor process for manufacturing them. Therefore, it is possible to create functions of these devices at once without increasing the number of the steps. Consequently, it is possible to reduce the size of the optical system in the optical information recording and reproducing apparatus, so as to reduce the installation area. As it is possible to write and to read from the recording medium almost on the same axis, there is essentially no displacement between the optical system for writing and the optical system for reading, so that it is not necessary to adjust the displacement of the optical systems between them. According to the present invention, it is possible to provide an optical information recording and reproducing apparatus having such characteristics and being able to be manufactured at low cost, and also, to provide a modulation/light sensing device suitably used by such an optical information recording and reproducing apparatus.

Further features of the present invention will become apparent from the following description of exemplary embodiments (with reference to the attached drawings).

DESCRIPTION OF THE EMBODIMENTS

Next, preferred embodiments of the present invention will be described with reference to the drawings.

Figure 15:
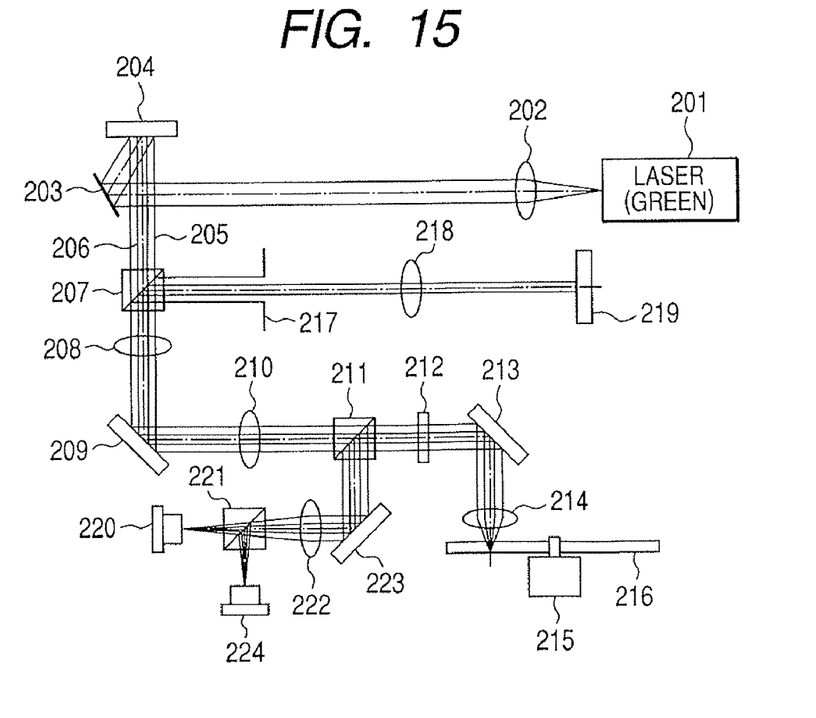
FIG. 15 is a diagram showing an overview of the optical information recording and reproducing apparatus using a holographic memory.

First, a description will be given by using FIG. 15 with regard to a recording and reproducing apparatus based on a holographic memory using a two-dimensional spatial light modulator (SLM) and a light sensing device consisting of a CMOS sensor, and the like. FIG. 15 describes an optical system of a coaxial type holographic memory system (optical information recording and reproducing apparatus), called a collinear system.

The optical information recording and reproducing apparatus records and reproduces information for a disk-like hologram recording medium 216, for instance. To be more specific, a signal beam, modulated by the information, and a reference light beam, not modulated by the information, are simultaneously irradiated on the recording medium 216, and interfere so as to form a volume hologram and to record the information within the recording medium 216. A weak reference light beam is irradiated on the recording medium 216 to obtain a reproduced image of the volume hologram and to reproduce the information. The volume hologram of the recording medium is a method of positively using a thickness direction of the recording medium and writing interference fringes three-dimensionally, which is the method for enhancing diffraction efficiency by increasing thickness and increasing a recording capacity by using multiple recording. A digital volume hologram is a hologram recording method limiting image information to be recorded to a digitized digital pattern, while using the same recording method as the volume hologram.

The optical system shown in the drawing includes a first light source 201 for generating a laser beam used for recording and reproduction of the information, a spatial light modulator (abbreviated to SLM hereafter) 204 for modulating the signal light beam (first light) and a two-dimensional light sensing device 219 for detecting a reproduced light beam (second light).

(Recording)

First, a description will be given as to a case of performing recording on the disk-like recording medium 216 by using the optical system.

A light beam (first light) emitted from the first light source 201, consisting of a green laser, or the like, is rendered as a parallel pencil beam by a collimator 202, so as to illuminate the spatial light modulator 204 via a mirror 203. As for the one shown in FIG. 15, a DMD (Deformable Mirror Device) is used as the SLM 204. Such an SLM 204 includes a large number of light modulators (pixels) two-dimensionally arranged, wherein each individual pixel can express "0" or "1". The light reflected off the pixel expressing the information on "1" on the SLM 204 is reflected in a direction of the recording medium 216, and the light reflected off the pixel expressing the information on "0" is not reflected in the direction of the recording medium 216. As for the SLM 204 used in a collinear holographic memory system, a central portion thereof is a portion for modulating an information light beam 206, while the portion circularly surrounding it is a portion for modulating a reference light beam 205.

Both the information light beam 206 and the reference light beam 205 reflected off the pixel expressing the information on "1" on the SLM 204 are transmitted through a polarization beam splitter (abbreviated to PBS hereafter) 207 as p-polarized light. They are directed toward the recording medium 216 by way of a first relay lens 208, a mirror 209, a second relay lens 210 and a dichroic beam splitter (abbreviated to DBS hereafter) 211. After passing through the DBS 211, the reference light beam 205 and information light beam 206 transmitted through a quarter wavelength plate (abbreviated to QWP hereafter) 212 and converted to circular light (right-hand circular light, for instance), are reflected off a mirror 213 and enter an objective 214 having a focal length F. The pattern displayed on the SLM 204 forms an intermediate image before the objective 214 by the focal length F by means of the first relay lens 208 and second relay lens 210. Thus, a 4F optical system is formed, whereby a pattern image (not shown) on the SLM 204, the objective 214 and the recording medium 216 are all arranged to be spaced apart by the distance of F.

The disk-like recording medium 216 is rotatably held on a spindle motor 215. The reference light beam 205 and the information light beam 206 are collected on the recording medium 216 by the objective 214 and interfere, to form the interference fringes. An interference fringe pattern on this recording is recorded as a refractive-index distribution on a polymer material in the recording medium 216, so that the digital volume hologram is consequently formed. If the SLM 204 modulates the information light beam 206 according to the information to be recorded, the digital volume hologram according to that information is formed in the recording medium 216. If the modulation is performed according to the information to be recorded pixel by pixel in an information light beam region of the SLM 204, in particular, the digital volume hologram having an information amount according to such a number of pixels is formed on the recording medium 216. The recording medium 216 has a reflective film provided therein.

The optical information recording and reproducing apparatus is provided with a second light source 220 consisting of a red laser, or the like, which is non-photosensitive to the recording medium 216, besides the first light source 201 for recording and reproducing optical information, rendered as the hologram. It is possible, by using the second light source 220, to detect a displacement of the recording medium 216, with high precision, with the reflective film of the recording medium 216 as a reference plane. It is thereby possible, even if wobbling or decentering occurs on the recording medium 216, to have a recording spot dynamically follow a recording medium surface by using an optical servo technique, so as to record the interference fringe pattern with high precision. Such tracking will be briefly described below.

A linearly polarized light beam emitted from the second light source 220 consisting of a red laser, or the like, is transmitted through a beam splitter (abbreviated to BS hereafter) 221, rendered as a parallel pencil beam by a lens 222 and reflected off a mirror 223 and the DBS 211, so as to be directed to the recording medium 216. The light beam transmitted through the QWP 212 and converted to the circular light (right-hand circular light, for instance) is reflected off the mirror 213 and enters the objective 214, to be collected as a minute light spot on the reflective film of the recording medium 216. The reflected light beam becomes an inversely rotating circular light beam (left-hand circular light, for instance), re-enters the objective 214, and is rendered as a parallel pencil, reflected off the mirror 213 and transmitted through the QWP 212, to be converted to the linearly polarized light beam perpendicular to the polarized light outward. The light beam reflected off the DBS 211 is reflected off the BS 221 by way of the mirror 223 and lens 222, outwardly, so as to be led to a photo-detector 224. The photo-detector 224 has multiple acceptance surfaces, and detects positional information on a reflecting surface. Focusing and tracking of the objective 214 can be performed based on results of the detection. Such focusing and tracking are the same as what is performed on a conventionally well-known optical information recording and reproducing apparatus using a CD or a DVD.

(Reproduction)

Next, a description will be given with reference to the case of reproducing the information recorded on the recording medium 216, by using the optical system. The light beam emitted from the laser light source 201 illuminates the SLM 204 as in the case of the recording. On reproduction, only the portion for modulating the reference light beam 205 of the SLM 204 displays the information on "1," while any portion for modulating the information light beam 206 displays the information on "0". Therefore, only the light reflected off the pixels in the portion of the reference light beam 205 is reflected in the direction of the recording medium 216, while the information light beam 206 is not reflected in the direction of the recording medium 216.

As in the case of the recording, the reference light beam 205 becomes the circular light (right-hand circular light, for instance), and is collected on the recording medium 216, to generate the information light beam from the recorded interference fringes (digital volume holograms). The information light beam (second light) reflected off the reflective film in the recording medium 216 becomes inversely rotating circular light (left-hand circular light, for instance), re-enters the objective 214, and is rendered as a parallel pencil beam, reflected off the mirror 213 and transmitted through the QWP 212, to be converted to the linearly polarized light beam (s-polarized light), perpendicular to the polarized light outward. In this case, an intermediate image of a display pattern of the SLM 204 reproduced at the distance of F from the object 214 is formed.

The light beam transmitted through the DBS 211 is directed to the PBS 207 by way of the second relay lens 210, the mirror 209 and the first relay lens 208. The light beam reflected off the PBS 207 is refocused as the intermediate image of the display pattern of the SLM 204 at a position coupled with the SLM 204. An opening 217 is placed at this position in advance, which blocks off any unnecessary reference light beam in a periphery of the information light beam. A lens 218 causes the refocused intermediate image to form the display pattern of only the information light beam of the SLM 204 on the light sensing device 219, such as a CMOS sensor. Thus, the unnecessary reference light beam 205 does not enter the light sensing device 219, and so a regenerative signal having a good S/N (signal to noise) ratio can be obtained.

First Embodiment

Figure 1:
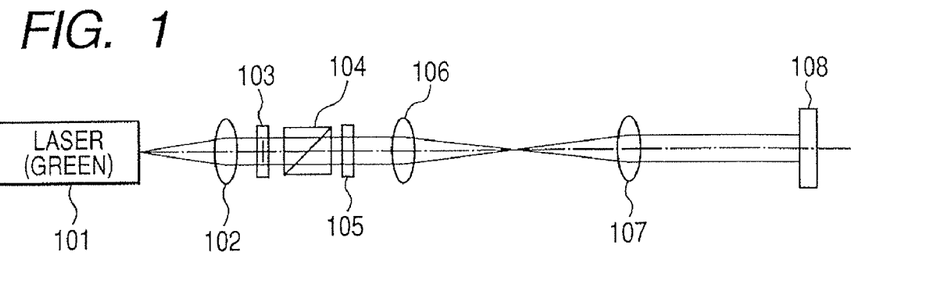
FIG. 1 is a diagram for describing an optical system of an optical information recording and reproducing apparatus according to a first embodiment of the present invention, which shows a light source for a modulation/light sensing device on recording.
Figure 2:
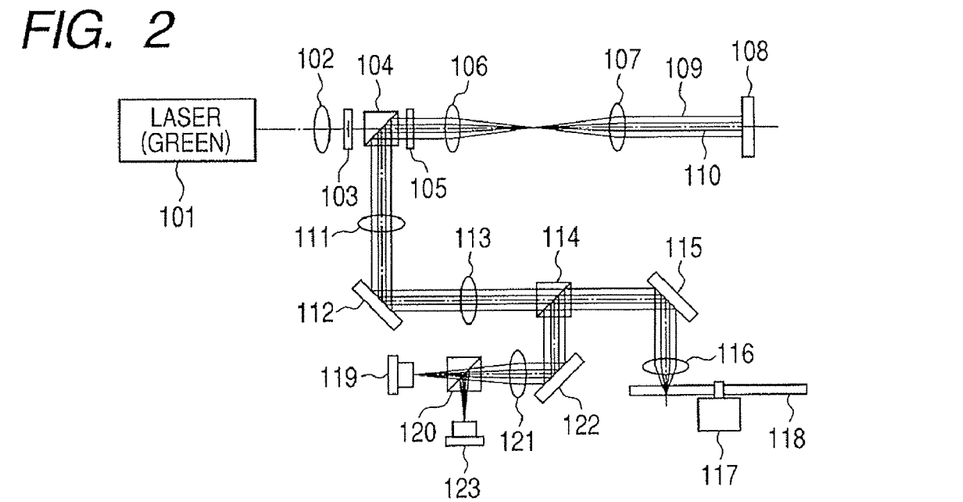
FIG. 2 is a diagram for describing the optical system of the optical information recording and reproducing apparatus according to the first embodiment, which shows the modulation/light sensing device for a recording medium on recording.
Figure 3:
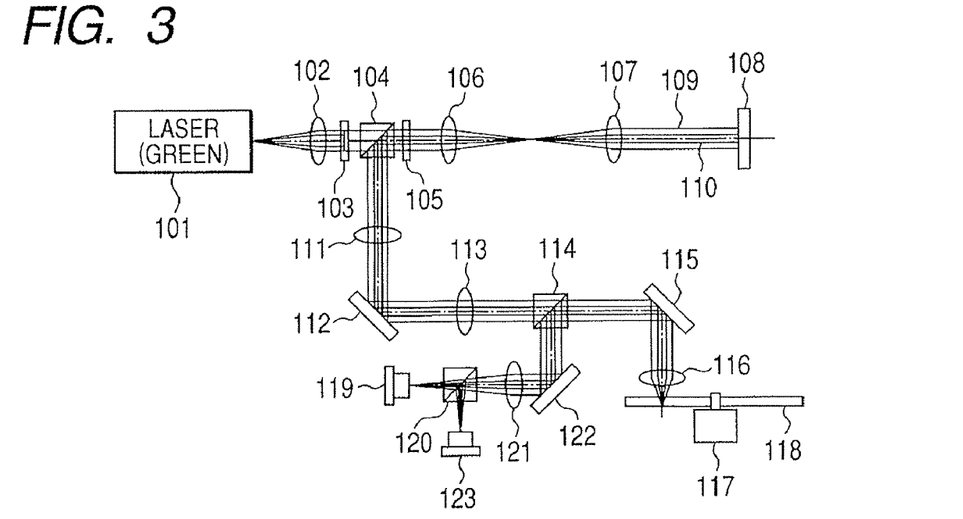
FIG. 3 is a diagram for describing the optical system of the optical information recording and reproducing apparatus according to the first embodiment, which shows the optical system on reproduction.

First, the optical information recording and reproducing apparatus according to the first embodiment of the present invention will be described. This optical information recording and reproducing apparatus is configured as a collinear holographic memory system, wherein the spatial light modulator and the light sensing device for detecting a reproduced beam, such as a CMOS image sensor, are formed on the same semiconductor chip. FIGS. 1 to 3 are diagrams for describing the optical system of the optical information recording and reproducing apparatus according to this embodiment. FIG. 1 shows the optical system from the light source to the spatial light modulator on recording, FIG. 2 shows the optical system from the spatial light modulator to a hologram disk (recording medium) on recording, and FIG. 3 shows the optical system on reproduction.

The optical information recording and reproducing apparatus of this embodiment records information on a hologram recording medium 186, which is disk-like, by writing a volume hologram, for instance, and reproduces the information by obtaining a reproduced image of the volume hologram. The optical system shown includes a first light source 101 for generating a laser beam used for recording and reproduction of the information, a modulation/light sensing device (SLM/CMOS) 108 integrally provided with a spatial light modulator (SLM) for modulating a signal light beam (first light) and a two-dimensional light sensing device for detecting a reproduced light beam (second light).

As will be described later, this embodiment uses the spatial light modulator including a reflective optical interferometric modulator as the spatial light modulator portion of the modulation/light sensing device 108, and also uses a CMOS sensor as the light sensing device. The modulation/light sensing device 108 is configured by stacking the spatial light modulator and the CMOS sensor longitudinally on a silicon semiconductor substrate. It is possible, by using this configuration, to coaxially perform light modulation with the spatial light modulator and light reception with the light sensing device.

First, the case of performing the recording on a recording medium 118, which is a hologram disk, will be described with reference to FIGS. 1 and 2. In FIG. 1, a light beam (first light) emitted from the first light source 101 consisting of a green laser, or the like, is rendered as a parallel pencil beam by a collimator 102, so as to enter a mask device 103. The mask device 103 has a function of masking a portion equivalent to the information light beam in a central portion of the light beam. A liquid crystal device may be used as the mask device 103, for instance. A mask for shielding the central portion of the light beam may be inserted into an optical path. When recording the information, the mask device 103 does not function, and transmits all the light beams. The light transmitted through the mask device 103 enters a polarization beam splitter (abbreviated to PBS hereafter) 104.

The light beam transmitted through the PBS 104 as the p-polarized light is transmitted through a quarter wavelength plate (abbreviated to QWP hereafter) 105 provided as required, goes through a first relay lens 106 and a second relay lens 107, and is radiated on the modulation/light sensing device 108 having the spatial light modulator (SLM) and the CMOS sensor mounted on one chip. In the case of using an optical interferometric modulator (iMOD) configured not to change a polarization state as the SLM, the QWP 105 should be provided in advance at an in-plane mounting angle at which linear polarization changes by 90° both ways. In the case of a liquid crystal on silicon (LCOS) device configured to change the polarization state by 90° as the SLM, the QWP 105 is not necessary. In reality, however, there are differences in a refractive index between a design and an actual SLM, and in thickness of the liquid crystal, and it is necessary, in the case of the liquid crystal, to incline an orientation of the liquid crystal slightly (by several degrees) in an initial state, called pretilt, so that slight reflection from the PBS 104 is recognized as black "0" and contrast between black and white becomes less. In the case when this contrast is not allowed system-wise, the QWP 105 is installed to adjust the in-plane mounting angle for the sake of setting the reflection from the PBS 104 at black "0" at a minimum value. Here, the optical interferometric modulator (iMOD) is a device including a light reflection electrode and a semi-transparent film placed before the light reflection electrode. The semi-transparent film has a function of transmitting incident light at a certain ratio and reflecting the rest. The optical interferometric modulator performs light modulation by using interference between reflected light from a semi-transparent film surface having the incident light from the semi-transparent film side and the reflected light transmitted through the semi-transparent film and reflected off the light reflection electrode. The light reflection electrode also has a property of reflecting the light. Here, it is possible, by changing the distance of an air gap between the semi-transparent film and the light reflection electrode, to control the reflectance of the entire incident light, so as to modulate the intensity of the reflected light. The distance of the air gap can be controlled by applying a signal voltage between the semi-transparent film and the light reflection electrode, and displacing the semi-transparent film by a Coulomb force due to an electrical field generated by the signal voltage. It is desirable to use a thin film of Ti (titanium) as the semi-transparent film.

A recording operation will be described below by dividing it into the case of using a device consisting of a combination of an iMOD and a CMOS (iMOD/CMOS), and the case of using a device consisting of a combination of an LCOS and a CMOS (LCOS/CMOS) as the modulation/light sensing device 108.

The case of iMOD/CMOS:

The light beam transmitted through the QWP 105 is converted to a circular light beam (right-hand circular light, for instance) and illuminates the modulation/light sensing device 108 by way of the first relay lens 106 and the second relay lens 107. The light reflected off the pixel expressing the information on "1 (white)" on the SLM of the modulation/light sensing device 108 is reflected in the direction of the recording medium 118 at a high reflectance, while the light reflected off the pixel expressing the information on "0 (black)" on the SLM is only slightly reflected in the direction of the recording medium 118 due to the interference. As with the conventional example, a collinear SLM is provided with a portion for modulating an information light beam 110 and a portion for modulating a reference light beam 109 circularly surrounding it.

Below, with reference to FIG. 2, the light beam reflected off the SLM of the modulation/light sensing device 108 is rendered as an inversely rotating circular light beam (right-hand circular light, for instance). The light beam having gone through the second relay lens 107 and first relay lens 106 is transmitted through the QWP 105, and converted to the s-polarized light to be reflected off the PBS 104 and oriented in the direction of the recording medium 118.

The case of LCOS/CMOS:

In a case when the LCOS/CMOS is used as the modulation/light sensing device 108, the light beam transmitted through the PBS 104 illuminates the modulation/light sensing device 108 by way of the first relay lens 106 and the second relay lens 107. The light reflected off the pixel expressing the information on "1 (white)" on the SLM is converted to the s-polarized light, while the light reflected off the pixel expressing the information on "0 (black)" keeps the state of the p-polarized light. As with the conventional example, a collinear SLM is provided with the portion for modulating the information light beam 110 and the portion for modulating the reference light beam 109 circularly surrounding it thereon.

Below, with reference to FIG. 2, the s-polarized light of the light beam reflected off the modulation/light sensing device 108 is reflected off the PBS 104 and oriented in the direction of the hologram disk 118, and the p-polarized light is transmitted through the PBS 104, and not oriented in the direction of the hologram disk 118.

Either in the case of using the iMOD/CMOS or in the case of using the LCOS/CMOS, the reference light beam 109 and the information light beam 110 reflected off the pixel expressing the information on "1 (white)" on the SLM of the modulation/light sensing device 108 are reflected off the PBS 104, and directed to the recording medium 118 by way of a third relay lens 111, a mirror 112, a fourth relay lens 113 and a dichroic beam splitter (abbreviated to DBS hereafter) 114, so as to be reflected off a mirror 115, and enter an objective 116 of a focal length F. The pattern displayed on the SLM of the modulation/light sensing device 108 forms an intermediate image before the objective 116 by the focal length F by means of the third relay lens 111 and fourth relay lens 112. Thus, a 4F optical system is formed, whereby a pattern image (not shown) on the SLM of the modulation/light sensing device 108, the objective 116 and the recording medium 118 are all arranged to be spaced apart by the distance of F.

The disk-like recording medium 118 is rotatably held on a spindle motor 117. The reference light beam 109 and the information light beam 110 are collected on the recording medium 118 by the objective 116 and interfere, to form the interference fringes. An interference fringe pattern on this recording is recorded as a refractive-index distribution on a polymer material in the recording medium 118, so that the digital volume hologram is formed. In particular, if the information light beam 110 is modulated according to the information to be recorded, the digital volume hologram according to that information is formed in the recording medium 118. The recording medium 118 has a reflective film provided therein.

As with the conventional example, the optical information recording and reproducing apparatus is provided with a second light source 119, consisting of a red laser, or the like, which is non-photosensitive to the recording medium 118, besides the first light source 101 for recording and reproducing optical information rendered as the holograms. It is possible, by using the second light source 119, to detect a displacement of the recording medium 118, with high precision, with the reflective film of the recording medium 118 as a reference plane. It is thereby possible, even if wobbling or decentering occurs on the recording medium 118, to have a recording spot dynamically follow a recording medium surface by using an optical servo technique, so as to record the interference fringe pattern (digital volume hologram) with high precision. It will be briefly described below.

The light beam emitted from the second light source 119 is transmitted through a beam splitter (abbreviated to BS hereafter) 120, rendered as a parallel pencil beam by a lens 121 and reflected off a mirror 122 and the DBS 114, so as to be directed to the recording medium 118. Thereafter, the light beam is reflected off the mirror 115 and enters the objective 116 to be collected as a minute light spot on the reflective film of the recording medium 118. The reflected light beam re-enters the objective 116 and is rendered as a parallel pencil beam, sequentially reflected off the mirror 115 and DBS 114, and partially reflected off the beam splitter BS 120, by way of the mirror 122 and lens 121 outwardly, so as to be led to a photo-detector 123. The photo-detector 123 has multiple acceptance surfaces and detects positional information on a reflecting surface by a heretofore known method, so that focusing and tracking of the objective 116 can be performed based on it.

Next, a description will be given with reference to FIG. 3, as to the operation of reproducing the information recorded as the digital volume hologram on the recording medium 118. The light beam emitted from the first light source 101 is radiated on the modulation/light sensing device 108 as in the case of the recording. In this case, the intensity of the light from the first light source 101 is rendered lower than the intensity used on recording, so as not to destroy the information recorded on the recording medium 118. On reproduction, the mask device 103 masks the portion equivalent to the information light beam in the central portion of the light beam. According to this embodiment, the liquid crystal device configuring the mask device 103 has a polarization direction turned by 90° only in the central portion of the light beam to be the s-polarized light, which is reflected off the following PBS 104, so as not to reach the modulation/light sensing device 108. A mask for shielding the central portion may be inserted into the optical path.

The first relay lens 106 and the second relay lens 107 have a role of focusing an image of the mask device 103 on the SLM of the modulation/light sensing device 108. Thus, only the device of the reference light beam portion is illuminated while the information light beam portion is neatly shielded by the image of the mask device 103. As for the SLM of the modulation/light sensing device 108, only the portion for modulating the reference light beam 109 displays the information on "1 (white)," while any portion for modulating the information light beam 110 displays the information on "0 (black)". Therefore, only the light reflected off the pixels in the portion for modulating the reference light beam 109 is reflected in the direction of the recording medium 118. The light beam of the pixels in the portion for reflecting the information light beam 110 is not reflected in the direction of the recording medium 118, and, besides, it is not even illuminated from the very start. It is thereby possible to reproduce an information light beam having a better S/N, in comparison with the conventional example.

As in the case of recording, the reference light beam 109 is reflected off the PBS 104 and collected on the recording medium 118, and reproduces the information light beam from the record interference fringes. The information light beam (that is, a reproduced beam) (second light) reflected off the reflective film in the recording medium 118 re-enters the objective 116 and is rendered as a parallel pencil beam to be reflected off the mirror 115. In this case, an intermediate image of a reproduced display pattern of the SLM is formed at the distance of F from the objective 116.

The light beam transmitted through the DBS 114 is directed to the PBS 104 by way of the fourth relay lens 113, the mirror 112 and the third relay lens 111, and is refocused as the intermediate image (not shown) of the display pattern of the SLM at a position coupled with the mask device 103 by the fourth relay lens 113 and the third relay lens 111. And the refocused intermediate image is reflected off the PBS 104, and is formed on the modulation/light sensing device 108 by the first relay lens 106 and the second relay lens 107. According to this embodiment, each of the pixels uses the CMOS sensor including a photodiode and an MOS transistor for amplifying a photoreceiving signal detected by the photodiode as the light sensing device. Furthermore, this embodiment uses the spatial light modulator (SLM) and the light sensing device, such as the CMOS sensor placed on the same chip as the modulation/light sensing device 108. Therefore, a complicated mechanism for aligning them is not necessary. It is also possible to perform cost reduction and to make the optical system more compact.

Figure 4:
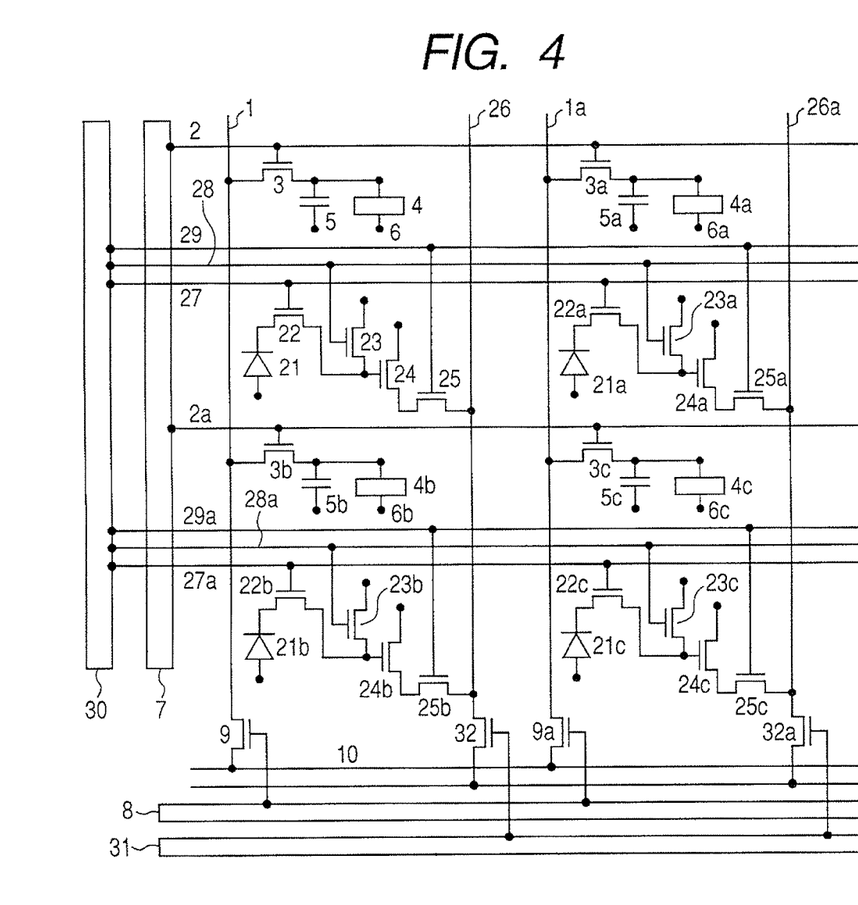
FIG. 4 is an equivalent circuit schematic of the modulation/light sensing device including a driving circuit portion.

Next, a description will be given as to circuit operations for recording and reproduction performed by the optical information recording and reproducing apparatus according to this embodiment. FIG. 4 is an equivalent circuit schematic for describing the modulation/light sensing device used in this embodiment, integrating the SLM using the reflective optical interferometric modulator with the light sensing device consisting of the CMOS sensor. In FIG. 4, reference numerals 1 to 10 are given to components related to the spatial light modulator, and reference numerals 21 to 33 are given to the components related to the light sensing device configured as a CMOS image sensor.

Multiple vertical signal lines 1, 1a, and so on, extended in columns (shown in a vertical direction) and multiple drive lines (scanning lines) 2, 2a, and so on, extended in rows (shown in a horizontal direction) are provided. They configure matrix wiring, where intersections of the vertical signal lines and the drive lines correspond to the pixels, respectively. Therefore, the pixels are arranged as in a matrix, so that the vertical signal lines are provided to each individual column of a pixel array and the drive lines are provided to each individual row. The vertical signal lines 1, 1a, and so on, are intended for the spatial light modulator. Similarly, vertical signal lines 26, 26a, and so on, for the light sensing device are provided to each individual column. Furthermore, horizontal read lines 27, 27a, and so on, horizontal reset lines 28, 28a, and so on, and horizontal selection lines 29, 29a, and so on, for the light sensing device are provided to each individual row.

Each of the pixels is provided with pixel switches 3, 3a, and so on, consisting of switching transistors, interference structure positions 4, 4a, and so on, and retention volumes 5, 5a, and so on, for the spatial light modulator. Each of the pixels is also provided with photodiodes 21, 21a, and so on, transfer switches 22, 22a, and so on, consisting of transistors, reset switches 23, 23a, and so on, consisting of transistors, amplifying transistors 24, 24a, and so on, and selection switches 25, 25a, and so on, consisting of transistors for the light sensing device.

In the spatial light modulator portion of each individual pixel, gates of the pixel switches 3, 3a, and so on, are connected to the corresponding drive lines 2, 2a, and so on, and drains are connected to the corresponding vertical signal lines 1, 1a, and so on. The retention volume 5, 5a, and so on, are provided between sources of the pixel switches and constant potential points (such as ground potential points). Furthermore, the interference structure portions 4, 4a, and so on, are also connected to the sources of the pixel switches. Each of the interference structure portions is provided with a common counter electrode 6, which is common among the pixels. One end of the vertical signal lines 1, 1a, and so on, are connected to a horizontal signal line 10 for the spatial light modulator, via sampling switches 9, 9a, and so on, respectively. The gates of the sampling switches 9, 9a, and so on, are connected to a horizontal shift register 8 of the spatial light modulator. One end of the drive lines 2, 2a, and so on, are connected to a vertical shift register 7.

Here, the interference structure portion is provided with the above-mentioned light reflection electrode and semi-transparent film, and the semi-transparent film is provided as the common counter electrode 6 to each of the pixels in common. The light reflection electrode is connected to the source of the pixel switch for each individual pixel.

In the light sensing device portion of each individual pixel, anodes of the photodiodes 21, 21a, and so on, are grounded, while cathodes are connected to one end of the transfer switches 22, 22a, and so on, respectively. The gates of the transfer switches 22, 22a, and so on, are connected to the corresponding horizontal and read lines, and the other ends are connected to one end of the reset switches. The reset switches 23, 23a, and so on, are intended to reset the photodiodes and floating diffusion (FD) regions electrically connected thereto, to a predetermined potential, where the predetermined potential is applied to the other ends, and the gates are connected to the horizontal reset lines. Furthermore, the other ends of the transfer switches 22, 22a, and so on, are also connected to the gates of the amplifying transistors 24, 24a, and so on, for amplifying a signal load due to the photodiodes 21, 21a, and so on. The predetermined potential is applied to one end of the amplifying transistors 24, 24a, and so on, while the other ends are connected to the corresponding vertical signal lines of the light sensing device via the selection switches 25, 25a, and so on. The gates of the selection switches are connected to the corresponding horizontal selection lines. One end of vertical signal lines 26, 26a, and so on, of the light sensing device are connected to a horizontal signal line 33 of the light sensing device via sampling switches 32, 32a, and so on. The gates of the sampling switches 32, 32a, and so on, are connected to a horizontal shift register 31 of the light sensing device. One end of the horizontal read lines 27, 27a, and so on, horizontal reset lines 28, 28a, and so on, and horizontal selection lines 29, 29a, and so on, for the light sensing device are all connected to a vertical shift register 30 of the light sensing device.

In FIG. 4, the pixels are arranged in two rows and two columns. As a matter of course, the circuit of the modulation/light sensing device 108 of the optical information recording and reproducing apparatus according to this embodiment may have a matrix of configuration of a large number of pixels, such as one thousand rows and one thousand columns.

The circuit operation of the modulation/light sensing device 108 will be described. First, a write mode will be described. The operation on writing is the same as an active matrix operation of a general display apparatus, and the like.

First, an on signal is inputted to the drive line 2 from the vertical shift register 7, and the pixel switches 3 and 3a are put in an on state. In this state, the horizontal shift register 8 sequentially operates to transmit the signal from the horizontal signal line 10 to the vertical signal line 1. To be more specific, the sampling switch 9 is turned on first, the signal of the horizontal signal line 10 is written to the vertical signal line 1, and an electrical charge according to the signal is accumulated in the retention volumes 5 through the pixel switch 3. In the case of using the reflective optical interferometric modulator as the SLM, a potential difference between the light reflection electrode (not shown) of the interference structure portion 4 and the common counter electrode 6 is applied so that an electrical field is generated between them. The interference structure portion 4 is changed by the electrical field. To be more precise, the distance between the light reflection electrode and the common counter electrode 6 is changed to modulate the reflectance for the incident light to a desired value. Here, in a case when the LCOS is used as the SLM, one of the electrodes of a liquid crystal pixel should be connected to the pixel switch while rendering the other as the common counter electrode 6. In a case when the LCOS is used, the electrical field is generated to the liquid crystal portion, and the orientation of the liquid crystal is changed by the electrical field, so as to change a polarization property of the incident light. The reflectance is modulated to a desired value by a combination of a polarizing plate, a wavelength plate, and the like. As the SLM of the holographic memory system should have two gradations of black and white, a voltage capable of obtaining a maximum reflectance or a minimum reflectance is given to the interference structure portion 4 or the liquid crystal portion.

Next, the sampling switch 9 is turned off, and then, the sampling switch 9a is turned on to write the signal of the horizontal signal line 10 to the vertical signal line 1a, and this signal is written to the retention volumes 5a via the pixel switch 3a. The signals are sequentially written in a horizontal direction (in rows) in such a sequence.

After writing one line completely, the drive line 2 is turned off, and then, the signal is inputted to the drive line 2a to put the pixel switches 3b and 3c in the on state. Thereafter, the signals are sequentially written in the horizontal direction, as previously described. After writing the voltages to all the lines, this operation is repeated from the first line so as to rewrite the voltage of each individual pixel. After thus writing the signals to all the pixels, the light from the first light source 101 is caused to enter the modulation/light sensing device 108, so that it is reflected off each individual pixel as modulated light, and the reflected light interferes with the reference light beam 109 to be recorded on the recording medium 118.

The modulation/light sensing device 108 has the pixel for modulating the reference light beam 109, that is, the pixel in a referential optical region set to have a constant reflectance. For instance, the pixel may have the same configuration as the pixel lit by the information light beam to be given the voltage capable of obtaining the maximum reflectance. In the case of using the reflective optical interferometric modulator, for instance, it may simply have a mirror structure, rather than forming an interference structure.

Next, a read mode will be described.

The information recorded on the recording medium 118 is reproduced by the reference light beam 109, and a light intensity equivalent to "1" (white) or "0" (black) gets incident on a photosensitive pixel, so that the electrical charge of a corresponding amount is accumulated in the photodiodes 21, 21a, and so on. The on signal is outputted to the horizontal read lines 27 from the vertical shift register 30. And, the transfer switch 22 is put in the on state, so that the electrical charge accumulated in the photodiodes changes the potential of the gate of the amplifying transistor 24. Consequently, the voltage according to the signals stored in the photodiodes is outputted to the drain of the amplifying transistor 24. If the selection switch 25 is turned on from the vertical shift register 30 by the horizontal selection line 29, an output of the amplifying transistor 24 is transmitted to the vertical signal line 26. The horizontal shift register 31 is sequentially operated, and the sampling switch 32 is turned on to send the information from the vertical signal line 26 to the horizontal signal line 33. After turning off the sampling switch 32, the sampling switch 32a of the next column is turned on to send the signal likewise. After sending all the signals of one line, it moves on to the next row by means of the vertical shift register 30, to sequentially read out the signals likewise. Thereafter, the signals recorded on the recording medium 118 are reproduced based on the signals read out.

In a case when the SLM using the reflective optical interferometric modulator is integrated with the CMOS sensor as the light sensing device by stacking them on a silicon substrate, the light sensing device is also positioned on the underside of the above-mentioned semi-transparent film of the interference structure portion. Therefore, it is necessary, immediately before performing the read mode, to put the transistors 3, 3a, 3b, and so on, of the SLMs of all the pixels for photo-receiving the information in the on state once, so as to keep them in the state where the interference structure portions 4, 4a, 4b, and so on, indicate a similar transmittance.

The circuit diagram shown in FIG. 4 is applicable in common to the case of integrally stacking the spatial light modulator and the light sensing device in a vertical direction, and also the case of rendering the light modulator and the light sensing device mutually adjacent without overlapping as to each individual pixel.

Figure 5:
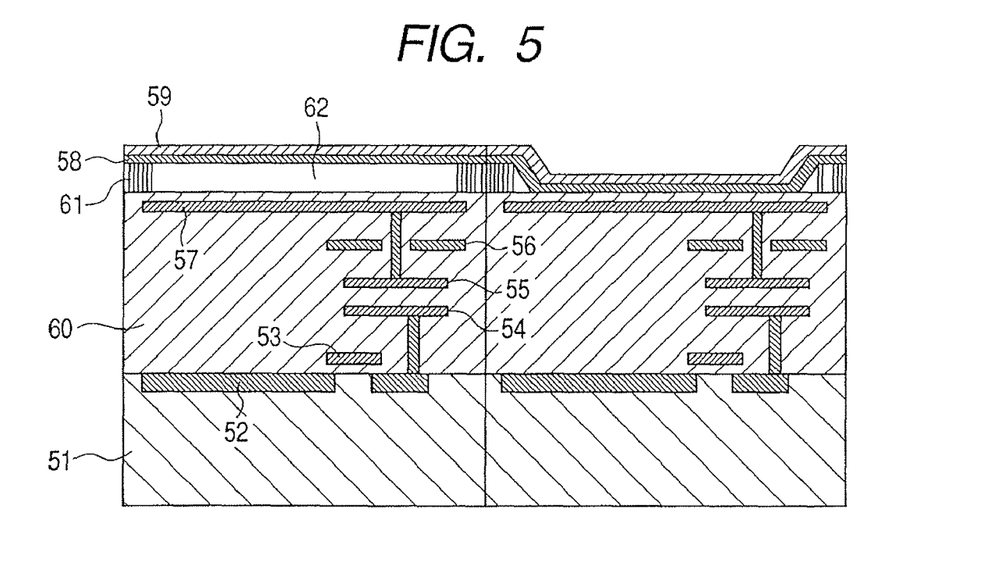
FIG. 5 is a sectional view showing a configuration of the modulation/light sensing device according to the first embodiment.

Next, a description will be given as to the structure of the modulation/light sensing device, which vertically integrates, namely, stacks, the SLM using the reflective optical interferometric modulator with the CMOS sensor as the light sensing device according to this embodiment. FIG. 5 shows a cross-sectional structure of a substantial part of such a modulation/light sensing device. Here, a region equivalent to two pixels is shown. It describes an example of using the CMOS sensor capable of fast readout as the light sensing device. However, the kind of light sensing device is not limited in particular, and so it may be a CCD or another light sensor. On reproduction, it is necessary to detect an optical image pattern only in the region of the information light beam, and so it is possible to have the light sensing device formed only in the information light beam region of the SLM.

A photodiode 52 is formed and a gate electrode 53 of the transfer switch of the CMOS sensor is provided on the surface of a single-crystal silicon (Si) substrate 51. An interlayer insulation film 60 is provided to cover the entire surface thereof, and a wiring 54 of the CMOS sensor, a wiring 55 of the SLM and a light shielding film 56 are provided in the interlayer insulation film 60. The light shielding film 56 is intended to prevent the incident light from reaching a lower transistor region. A light reflection electrode 57 is provided closest to the surface of the interlayer insulation film 60. The wiring 54 is connected to source and drain electrodes of the transfer switch via a contact hole, and the wiring 55 is connected to the light reflection electrode 57 via a contact hole. A support-like insulating film 61 is provided at a position on the surface of the interlayer insulation film 60, which is the periphery of the light reflection electrode 57, and a semi-transparent film 58 is provided as if held by the insulating film 61. An air gap 62 is formed between the semi-transparent film 58 and the light reflection electrode 57. A protective film 59 is formed on the entire surface of the semi-transparent film 58, not facing the air gap 62, out of the surfaces of the semi-transparent film 58. This diagram omits on LOCOS oxide film, and the like, for inter-element insulation, other transistors and wiring of the CMOS sensor, and the pixel switches and wiring of the SLM.

This modulation/light sensing device causes the incident light (first light) to interfere between the light reflection electrode (first interference mirror) 57 and the semi-transparent film (second interference mirror) 58, and changes the distance of the air gap (such as air) 62, so as to change the reflectance and transmittance. In this configuration, the SLM using the reflective optical interferometric modulator is vertically integrated with the CMOS sensor as the light sensing device.

Therefore, a transmissive mode is also used on reading the light (second light) entering the CMOS sensor as the light sensing device, and so both the interference mirrors (that is, the semi-transparent film 58 and the light reflection electrode 57) should be half transparent. In the case of a transverse configuration, however, it is necessary to use the transmissive mode for the interference structure portion 4, so that the light reflection electrode 57 does not have to be half transparent. In a case when the light reflection electrode 57 is not half transparent, it is desirable to use a material of a high reflectance for the light reflection electrode 57. It is possible, for instance, to use a metal film, such as Al, Alsi, AlCu, Ti, Ta, W, Ag, Pt, Ru, Ni, Au or TiN, or a compound film thereof. However, the material of the light reflection electrode is not limited to those indicated here. The support-like insulating film 61 placed between the light reflection electrode 57 and the semi-transparent film 58 is formed by a silicon nitride film, for instance, and the protective film 59 of the semi-transparent film 58 is formed by a silicon dioxide film, for instance. As for the support-like insulating film 61, interlayer insulation film 60 and protective film 59, any electrical insulating material may be used without limitation in particular, and they may be configured either by different materials or by the same material.

Next, the operation of the modulation/light sensing device as the interference structure portion will be described. First, the semi-transparent film 58 consisting of Ti is given a ground potential of 0V, for instance. The light reflection electrode 57 is given a voltage according to the signal by the aforementioned active matrix operation, and a potential difference arises between the light reflection electrode 57 and the semi-transparent film 58, so that the air gap is changed by the Coulomb force thereby generated. If the light enters from the upside in the drawing, a portion of a certain ratio of the incident light is reflected off the surface of the semi-transparent film 58, and the rest is transmitted through the semi-transparent film 58, and reflected off the light reflection electrode 57, so as to be transmitted through the semi-transparent film 58 and emitted outside. In this case, the component reflected off the surface of the semi-transparent film 58 and the component reflected off the light reflection electrode 57 interfere, so that the intensity of the entire reflected light changes according to a phase difference between them. The phase difference is decided by an optical path difference which is twice the size of the air gap. Therefore, it is possible, by changing the air gap according to the signal voltage, to control the intensity of the reflected light (entire reflected light) as the interference structure portion.

Figure 6:
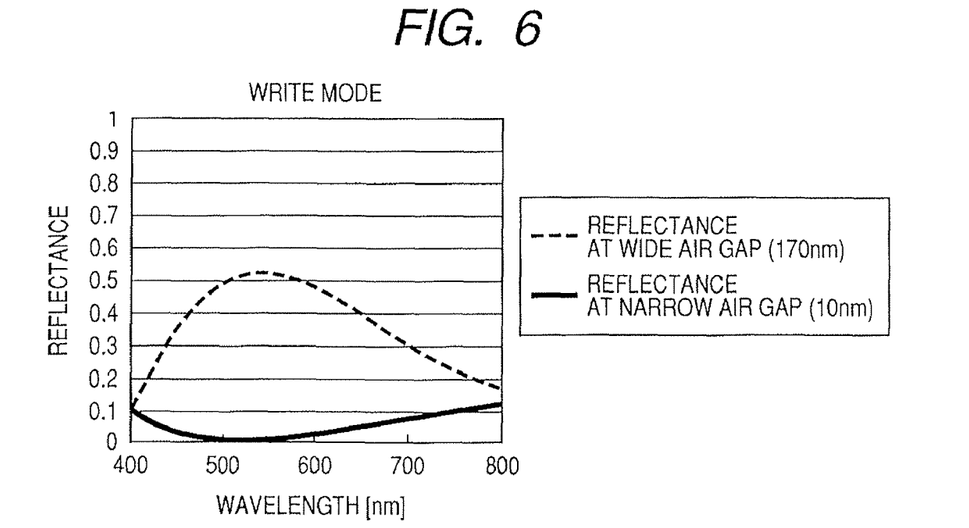
FIG. 6 is a graph showing a wavelength to reflectance characteristic of the modulation/light sensing device.

FIG. 6 is a graph showing a wavelength change of the reflectance at the air gap of 170 nm and at 10 nm in the case of thus configuring the interference structure portion. Here, 10 nm-thick $SiO_2$ layer was used as the protective film 59, a 5 nm-thick layer Ti, a 20 nm-thick $Si_3N_4$ layer, a 10 nm-thick $SiO_2$ layer and a 20 nm-thick $Si_3N_4$ layer were stacked, and used in this order as the semi-transparent film 58, and a 15 nm-thick Ti layer having a 10-nm-thick $SiO_2$ film on its surface was used as the light reflection electrode 57. As shown in FIG. 6, in the case of the light of 550 nm-wavelength, the reflectance is 52.5% at the air gap of 170 nm and 1.2% at the air gap of 10 nm. It is understandable that, as the air gap is changed from 10 nm to 170 nm by the voltage of the signal given to the light reflection electrode 57, the reflectance greatly changes in conjunction therewith. This interferential action is designable by the wavelength, semi-transparent film material and air gap, respectively. Therefore, it is important to take a configuration necessary as the interference structure portion in consideration of the characteristics such as physical intensity and a contrast ratio.

Figure 7:
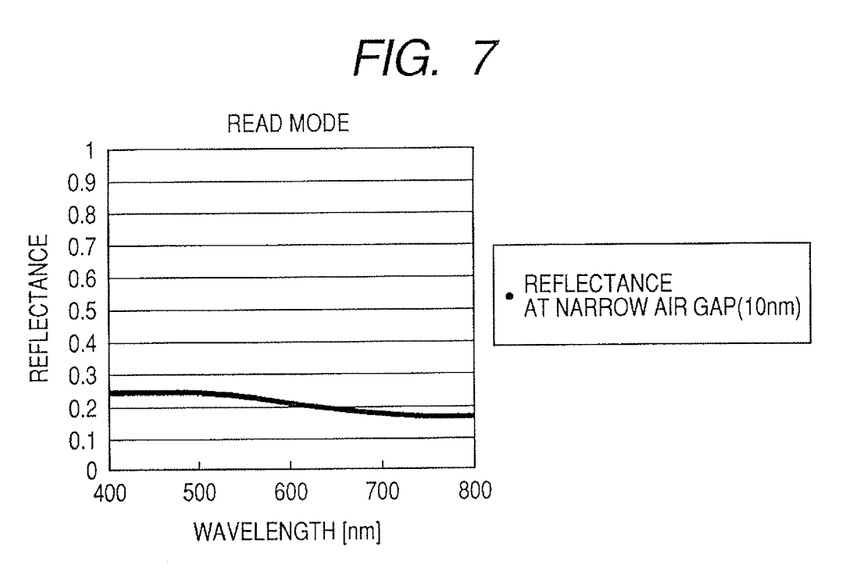
FIG. 7 is a graph showing a wavelength to transmittance characteristic of the modulation/light sensing device.

In the case of the read mode, it is necessary, concerning at least the pixels on which the information light beam (a part of first light) is incident, to keep the transmittance constant, while having the same state of optical interference. Thus, FIG. 7 shows the wavelength change at the transmittance in the case of setting the air gap at 10 nm on the modulation/light sensing device. In this case, the transmittance is relatively low at 23.0%. As for the transmittance, however, an absolute value thereof is not as important as being constant. It is possible, by keeping the transmittance constant, to determine the intensity of the reproduced light beam (second light) with the CMOS sensor so as to identify whether a pixel is a white pixel or a black pixel.

Next, a description will be given of a method of creating the modulation/light sensing device integrating the spatial light modulator (SLM) consisting of such a reflective optical interferometric modulator with the light sensing device as the CMOS sensor.

A silicon (Si) semiconductor substrate is used to form the CMOS sensor thereon by a known method. An arbitrary method may be used as a concrete formation method. At the same time, a transistor for writing to the SLM (the pixel switches 3, 3a, and so on, of FIG. 4) are formed by nMOS transistors. Thereafter, the interlayer insulation film is formed, the wirings are formed, and the reflective optical interferometric modulator is formed. An example of a concrete creation procedure is as follows.

An n-type single-crystal silicon semiconductor substrate undergoes localized thermal oxidation to form a LOCOS (Local Oxidation of Silicon) oxide film. Next, boron (B) is ion-implanted by a dose amount of $10^{11}$ cm$^{-2}$ or so with the LOCOS oxide film as the mask so as to form a p-type well, which is a p-type impurity region. This substrate undergoes the thermal oxidation again to form a gate oxide film having a thickness of 60 nm.

Next, after forming the gate electrode 53 consisting of n-type polysilicon having phosphorus (P) doped thereon by $10^{20}$ cm$^{-3}$ or so, phosphorus is ion-implanted on the entire surface of the substrate by the dose amount of $10^{13}$ cm$^{-2}$ or so, to form an n-type low-concentrated drain, which is an n-type impurity region having an impurity concentration of $10^{18}$ cm$^{-3}$ or so. Subsequently, the phosphorus is ion-implanted by the dose amount of $10^{15}$ cm$^{-2}$ or so, with a patterned photoresist as the mask to form a source/drain region having an impurity concentration of approximately $10^{20}$ cm$^{-3}$ so as to form the nMOS transistor. A pMOS transistor is formed likewise.

The CMOS sensor is created by a heretofore known method. The transistors configuring the CMOS sensor are simultaneously formable in the above transistor formation process, in which only a photodiode process should be added.

Thereafter, the interlay insulation film 60 is formed on the entire surface of the substrate. It is possible to use a PSG (Phospho-Silicate Glass) film, an NSG (Nondope Silicate Glass)/BPSG (Boro-Phospho-Silicate Glass) film, a CVD (Chemical Vapor Deposition) film with TEOS (Tetraethoxysilane), or the like, for the interlay insulation film, which is not limited in particular.

Next, the contact hole is patterned immediately upon the source/drain region, an aluminum (Al) layer is deposited by sputtering, or the like, and then patterned, so as to form the base wiring 54. To improve the ohmic contact characteristic of this base wiring layer 334 and the source/drain region, it is desirable to form a barrier metal, such as Ti/TiN, between the wiring 54 and the source/drain region. Thereafter, the interlayer insulation film is formed, and the light shielding film 56 is further formed by a metal film. It is possible to use the metal film of Ti, TiN, Al or Ag, for instance, or a film stack thereof for the light shielding film 56, which is not limited in particular. After patterning the light shielding film 56, the interlayer insulation film 60 is further formed, and the contact hole is provided at a predetermined position on the wiring 55 to form a plug. Next, tungsten is deposited on the plug, and is then smoothed out by a CMP (Chemical Mechanical Polishing) method.

Thereafter, Ti is deposited to an approximately 15 nm-thickness by sputtering, or the like, and is patterned to form the light reflection electrode 57. Next, a 15 nm-thickness silicon dioxide film is provided as the protective film of the light reflection electrode 57 by the CVD method.

Next, the silicon nitride film is formed by a plasma CVD method, and the support-like insulating film 61 is formed by etching after the patterning. Thereafter, a resist is applied and smoothed out, and is then further smoothed out, so that a support-like insulating layer 61 approximately 180 nm-height remains evenly. Next, a 20 nm-thick $Si_3N_4$ layer, a 10 nm-thick $SiO_2$ layer, a 20 nm-thick $Si_3N_4$ layer and a 5 nm-thick Ti layer are sequentially formed by low-temperature sputtering, and a silicon dioxide film as the protective film 59 is further deposited with a thickness of 10 nm. After the patterning, the silicon nitride film, the silicon dioxide film and a Ti layer are etched by dry or wet etching, and then, the resist is eliminated by wet etching. The semi-transparent film 58 and the protective film 59 are formed by this process. Thereafter, the reflective optical interferometric modulator is completed by taking out the electrodes by means of wire bonding.

Second Embodiment

Figure 8:
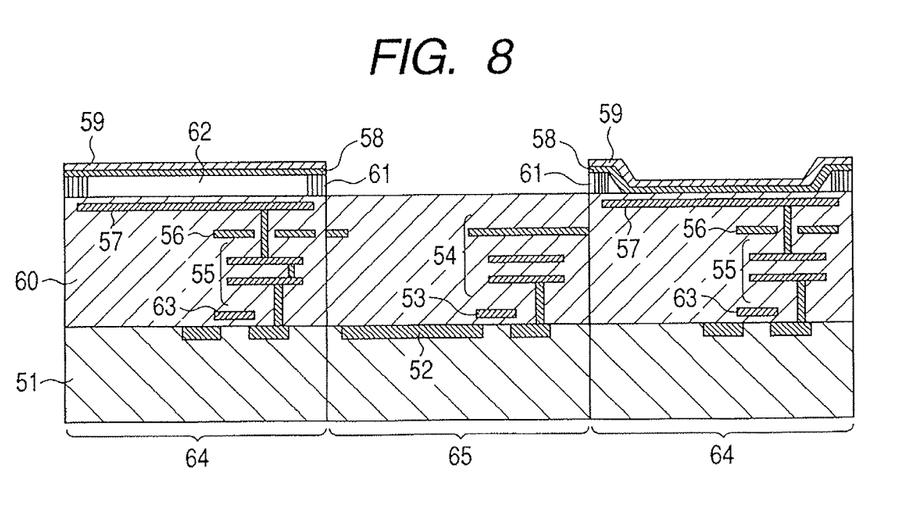
FIG. 8 is a sectional view showing the configuration of the modulation/light sensing device according to a second embodiment of the present invention.

According to the above-mentioned first embodiment, the spatial light modulator (SLM) was vertically integrated with the light sensing device (CMOS sensor) on the front face of the silicon semiconductor substrate. However, the present invention is not limited thereto. For example, the modulation/light sensing device 108 may have the spatial light modulator and the light sensing device transversely arranged for each individual pixel. FIG. 8 thus shows the modulation/light sensing device 108 having the SLM and the light sensing device transversely arranged.

The modulation/light sensing device 108 shown in FIG. 8 includes an SLM device region 64 having an SLM consisting of a reflective optical interferometric modulator and a CMOS sensor region 65 having a CMOS light sensing device for each individual pixel. The SLM device region 64 and CMOS sensor region 65 for each individual pixel are provided on the same silicon substrate 51 and arranged to be mutually adjacent.

A manufacturing process of the modulation/light sensing device shown in FIG. 8 is basically the same as the manufacturing process of the vertically arranged modulation/light sensing device shown in the first embodiment. To be more specific, the photodiode is not provided in the SLM device region 64, but an interference structure consisting of the light reflection electrode 57 and the semi-transparent film 58 is formed therein. In comparison, the interference structure is not formed in the CMOS sensor region 65, but the photodiode 52 is formed therein. Although not shown, an effective aperture ratio is increased by placing a microlens on the CMOS sensor region 65 in this structure.

In the case of such a transversely arranged modulation/light sensing device, the reflective optical interferometric modulator configuring the SLM does not require the transmissive mode for guiding the light to the light sensing device. Therefore, a relatively thick film consisting of aluminum (Al), or the like, may be used as the light reflection electrode 57.

Figure 9:
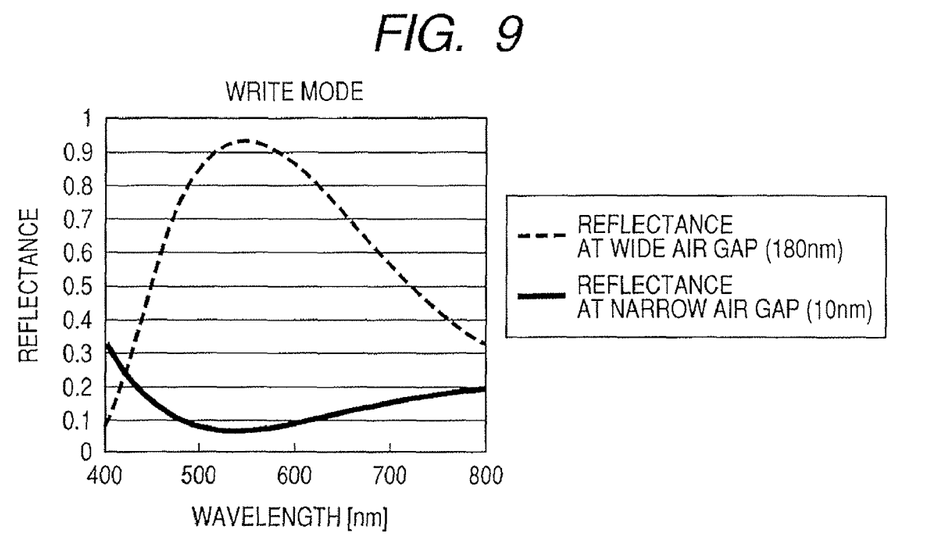
FIG. 9 is a graph showing the wavelength to reflectance characteristic of the modulation/light sensing device.

FIG. 9 is a graph showing the wavelength change of the reflectance at the air gap of 180 nm and at 10 nm in the case of thus configuring the interference structure portion. Here, a 10 nm-thick $SiO_2$ layer was used as the protective film 59, a 5 nm-thick Ti layer, a 20 nm-thick $Si_3N_4$ layer, a 10 nm-thick $SiO_2$ layer and a 20 nm-thick $Si_3N_4$ layer were stacked and used in this order as the semi-transparent film 58, and a 15 nm-thick AlSi layer having a 10 nm-thick $SiO_2$ film on its surface was used as the light reflection electrode 57. As shown in FIG. 9, in the case of the light of 550 nm-wavelength, the reflectance is 93.0% at the air gap of 180 nm and 0.6% at the air gap of 10 nm. It is understandable that, as the air gap is changed from 10 nm to 180 nm by the voltage of the signal given to the light reflection electrode 57, the reflectance greatly changes in conjunction therewith. This interferential action is designable by the wavelength, semi-transparent film material and air gap, respectively. Therefore, it is important to take a configuration necessary as the interference structure portion in consideration of the characteristics, such as physical intensity and a contrast ratio.

Third Embodiment

Figure 10:
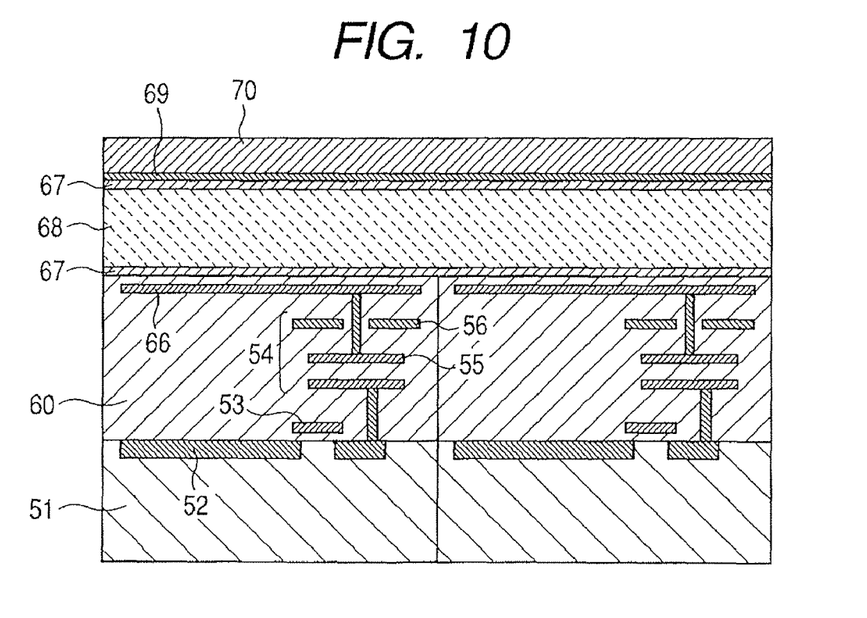
FIG. 10 is a sectional view showing the configuration of the modulation/light sensing device according to a third embodiment of the present invention.

According to this embodiment, what is used as the spatial light modulator is not limited to the above-mentioned reflective optical interferometric modulator. FIG. 10 shows one using a reflective liquid crystal device (LCOS) as the spatial light modulator and having the reflective liquid crystal device and the CMOS (sensor) vertically aligned on the modulation/light sensing device.

As with the modulation/light sensing device shown in FIG. 5, the photodiode 52 and the gate electrode 53 of the transfer switch are provided on the surface of the silicon substrate 51, the interlayer insulation film 60 is provided thereon, and the wirings 54, 55 and the light shielding film 56 are provided in the interlayer insulation film 60. As for the modulation/light sensing device shown in FIG. 10, a pixel electrode 66 for each individual pixel is provided in proximity to the surface of the interlayer insulation film 60. A glass plate 70 is provided opposite to the interlayer insulation film 60, and a liquid crystal 68 is encapsulated between the interlayer insulation film 60 and the glass plate 70. An ITO (Indium Tin Oxide) film 69 as a common electrode is formed on the surface of the liquid crystal 68 side of the glass plate 70, and an oriented film 67 is provided on the surface of the ITO film 69 and the interlayer insulation film 60. Here, a vertical liquid crystal is used as the liquid crystal 68, while an oblique evaporation $SiO_2$ film is used as the oriented film 67. A pixel electrode 66 is provided as the semi-transparent film having a reflectance of 50%, for instance. As for this modulation/light sensing device, the composition and thickness of the liquid crystal 68 is designed so that a phase displacement of $\lambda/2$ is generated when the incident light (first light) (wavelength: $\lambda$) passes through the liquid crystal 68, is reflected off the pixel electrode 66 and passes through the liquid crystal 68 again.

In the case of displaying "1" on such a modulation/light sensing device, a voltage is applied between the pixel electrode 66 and the common electrode 69, so that the electrical field is added to the liquid crystal 68 and liquid crystal molecules fall. In the case of displaying "0", no electrical field is added, and the liquid crystal molecules are standing almost perpendicularly. In the case of using such a reflective liquid crystal device as the spatial light modulator, when the modulation/light sensing device 108 has the light (first light) incident thereon, which has been rendered as linearly polarized light of the s-polarized light by the PBS (polarization beam splitter) 104 before the light incidence in the optical system shown in FIGS. 1 and 2, it is reflected off the pixel electrode at the intensity of 50% with the polarization direction unchanged in the case of displaying "0". In this case, the reflected light enters the PBS 104 again. As the polarized light has not changed, the light is reflected off the PBS 104 and does not reach the recording medium (hologram) 118. In the case of displaying "1", the reflectance on the pixel electrode 66 is 50%. However, the reflected light becomes linearly polarized light having its polarization plane turned by 90°, because the composition and thickness of the liquid crystal are set up as described above. Therefore, the reflected light enters the PBS 104 as the p-polarized light, and is transmitted and directed to the recording medium 118. The intensity of the light is 50% even in the case of "1", which is sufficient intensity for the sake of determining "1" and "0".

When reading out the information recorded on the recording medium 118, the liquid crystal 68 has only to transmit the reproduced light beam (second light) in the information light beam region. Therefore, the polarization of the liquid crystal 68 may be in any state, and the liquid crystal 68 may be in any state.

Fourth Embodiment

Figure 11:
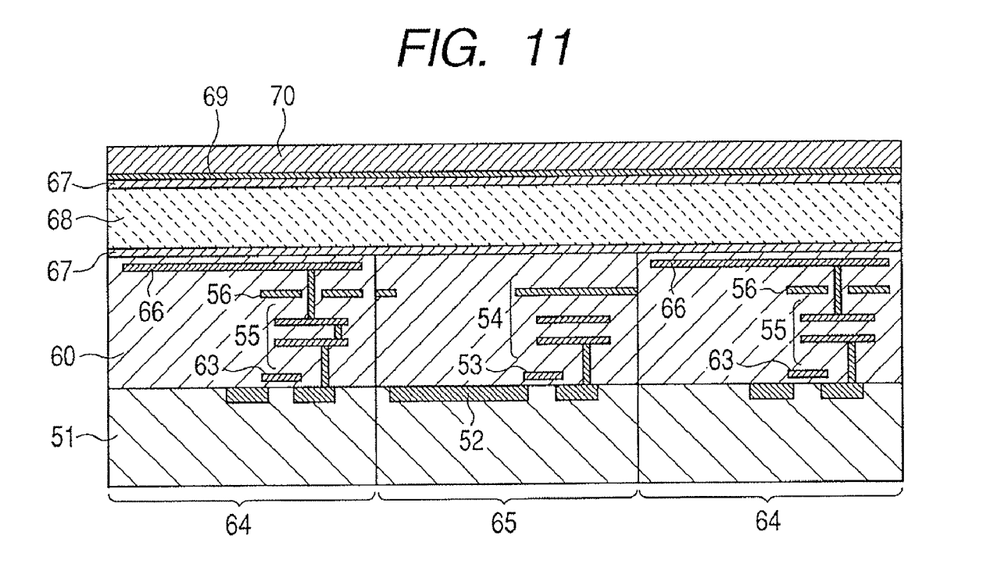
FIG. 11 is a sectional view showing the configuration of the modulation/light sensing device according to a fourth embodiment of the present invention.

In the case of using the reflective liquid crystal device (LCOS) as the spatial light modulator, as in the case of the reflective optical interferometric modulator, it is possible to make a transverse arrangement of the spatial light modulator and light sensing device for each individual pixel on the silicon substrate. FIG. 11 shows the modulation/light sensing device in such a transverse arrangement.

The modulation/light sensing device shown in FIG. 11 includes the SLM device region 64 having the SLM consisting of the reflective liquid crystal device and the CMOS sensor region 65 having the CMOS light sensing device for each individual pixel. The SLM device region 64 and the CMOS sensor region 65 for each individual pixel are provided on the same silicon substrate 51 and arranged to be mutually adjacent. The operation of the modulation/light sensing device as the spatial light modulator is the same as that in the case of the above-mentioned vertical arrangement either when recording the information or when reproducing the information.

It is also possible to use a ferroelectric material as a liquid crystal material used for the reflective liquid crystal device (LCOS). It is possible, by using the ferroelectric material, to follow high-speed driving so as to speed up writing and reading. As temperature dependence as a characteristic of the liquid crystal is significant, it is preferable to make the transverse arrangement rather than the vertical arrangement as in FIG. 11, where the modulation device can have a high contrast (ratio between black and white). This system, including the optical system, should have a sufficient margin to prevent accuracy of writing and reading from being impaired, even if there are variations in contrast.

Fifth Embodiment

According to the above-mentioned second and fourth embodiments, the modulation/light sensing device has the spatial light modulator (SLM) and the light sensing device (CMOS) transversely arranged on the silicon substrate for each individual pixel. Below, an example of a plane configuration relation between the spatial light modulator and the light sensing device will be described.

Figure 12:
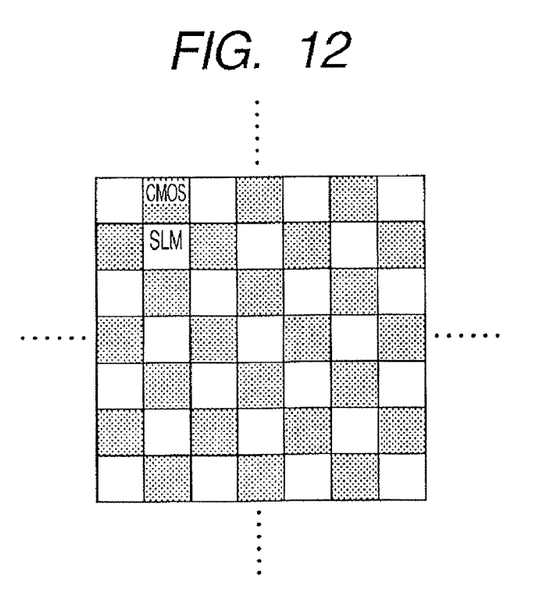
FIG. 12 is a diagram showing an example of a plane configuration of a spatial light modulator (an SLM) device portion and a CMOS cell portion of the modulation/light sensing device.
Figure 13:
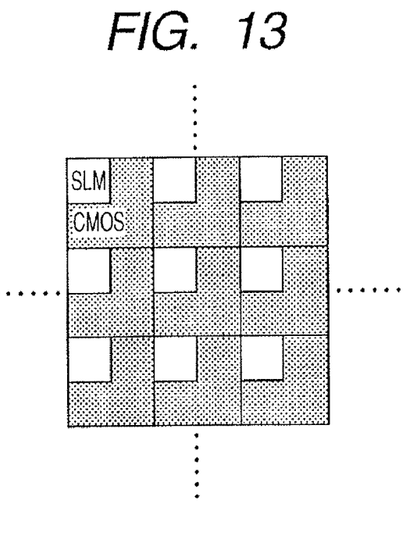
FIG. 13 is a diagram showing another example of the plane configuration of the SLM device portion and the CMOS cell portion of the modulation/light sensing device.
Figure 14:
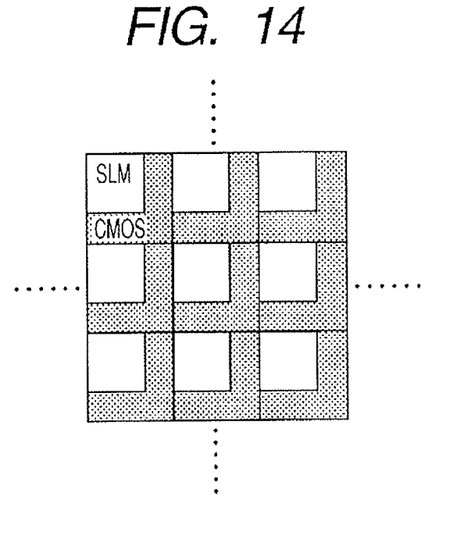
FIG. 14 is a diagram showing a further example of the plane configuration of the SLM device portion and the CMOS cell portion of the modulation/light sensing device.

FIG. 12 shows the plane configuration of the SLM device region and the CMOS sensor region in the case when both the SLM device region and CMOS sensor region are in a square planar shape of the same area. Here, the SLM device region and the CMOS sensor region are arranged checkerwise. In comparison, FIGS. 13 and 14 both show the examples of rendering the area of the CMOS sensor region larger than the area of the SLM device region, to improve photoreceiving sensitivity. In FIG. 13, an area ratio between the SLM device region and the CMOS sensor region is 1:3, or so, and it is 4:9, or so, in FIG. 14. It is also possible, though not shown here, to provide the SLM device region with a larger area than the CMOS sensor region. The area ratio between the SLM device region and the CMOS sensor region should be set to be an optimal value based on the intensity of the information light beam required on recording, the intensity of the reproduced beam required on reproduction, attenuation on the optical path on the way, and the like.

According to the embodiments of the present invention described above, the spatial light modulator and the light sensing device are provided on the same semiconductor substrate. Therefore, it is possible, compared with the case of providing the spatial light modulator and the light sensing device on separate chips, to reduce the number of chips to be manufactured by a silicon semiconductor process by half, from two pieces to one piece. A manufacturing process of the spatial light modulator and a manufacturing process of the light sensing device have many steps in common. Therefore, it is possible, after all, to create the functions of the spatial light modulator and the functions of the light sensing device at once, without increasing the number of the steps, so as to reduce the number of steps in total. It is also possible, according to these embodiments, to reduce the scale of the optical system as a holographic memory system, so as to reduce the installation area of the holographic memory system. It is further possible to place the spatial light modulator and the light sensing device coaxially, or almost coaxially, so that a complicated mechanism for aligning these devices becomes unnecessary, and adjustment of displacement of the optical system between them becomes unnecessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A device for spatially modulating at least a portion of a first light beam emitted from a light source and for receiving a second light beam from outside, said device comprising:
   a spatial light modulator for spatially modulating at least a portion of the first light beam, wherein the spatial light modulator includes a plurality of modulating elements that modulate an intensity of a reflected light beam according to a modulation signal; and
   a two-dimensional light sensing device for receiving the second light beam,
   wherein the spatial light modulator and the light sensing device are integrally provided on a same substrate, such that the plurality of modulating elements are arranged over an interlay insulation film covering a plurality of pixels of the light sensing device on the substrate, the spatial light modulator and the light sensing device are arranged on the same side of the substrate, and the light sensing device receives the second light beam incident through the spatial light modulator.

2. The device according to claim 1, wherein
the spatial light modulator and the light sensing device are stacked so that the spatial light modulator is placed on a side facing the light source ahead of the light sensing device, and
a pixel pitch of the spatial light modulator matches with a pixel pitch of the light sensing device, so that a pixel of the spatial light modulator and a corresponding pixel of the light sensing device are arranged along an optical axis of light incident from the light source to transmit at least a portion of the light incident on the spatial light modulator toward the light sensing device.

3. The device according to claim 2, wherein the spatial light modulator is capable of modulation setup, so that each of the pixels has a constant transmittance to the light sensing device.

4. The device according to claim 1, wherein the spatial light modulator and the light sensing device are placed adjacently to each other so that the pixel of the spatial light modulator and the corresponding pixel of the light sensing device do not overlap along the optical axis of the first light incident from a light source.

5. The device according to claim 1, wherein the spatial light modulator comprises a device which changes reflected light intensity according to a modulation signal.

6. The device according to claim 5, wherein the spatial light modulator comprises:
a light reflection electrode for reflecting the first light from a light source; and
a semi-transparent film placed further on the first light incident side than the light reflection electrode via space and showing semi-transparency to the light from the first light, and also comprises:
a device for changing a reflectance of the light from the light source by controlling a distance between the light reflection electrode and the semi-transparent film.

7. The device according to claim 5, wherein the spatial light modulator is a reflective liquid crystal device.

8. The device according to claim 1, wherein the substrate is a silicon semiconductor substrate.

9. An optical information recording and reproducing apparatus for recording information in a recording medium by forming interference fringes generated by interference between an information beam and a reference beam on the recording medium, and for reproducing the information by irradiating, with the reference beam, the recording medium in which the interference fringes are formed, said apparatus comprising:
a spatial light modulator for spatially modulating at least a portion of the light beam emitted from a light source into the information beam, wherein the spatial light modulator includes a plurality of modulating elements that modulate an intensity of a reflected light beam according to a modulation signal;
a first optical system for causing interference between the reference beam from the light source and the information beam from the spatial light modulator at a predetermined depth of the recording medium;
a second optical system that introduces the reference beam into the predetermined depth of the recording medium, reproduces the information beam from the interference fringes, and extracts the reproduced information beam;
a two-dimensional light sensing device; and
a third optical system for guiding the extracted information beam to the light sensing device,
wherein the spatial light modulator and the light sensing device are integrally provided on a same substrate, such that the plurality of modulating elements are arranged over an interlayer insulation film covering a plurality of pixels of the light sensing device on the substrate, the spatial light modulator and the light sensing device are arranged on the same side of the substrate, and the light sensing device receives the extracted information beam through the spatial light modulator.

10. The optical information recording and reproducing apparatus according to claim 9, wherein
the spatial light modulator and the light sensing device are stacked so that the spatial light modulator is placed on a side facing the light source ahead of the light sensing device, and
a pixel pitch of the spatial light modulator matches with a pixel pitch of the light sensing device, so that a pixel of the spatial light modulator and a corresponding pixel of the light sensing device are arranged along an optical axis of light incident from the light source to transmit at least a portion of the light incident on the spatial light modulator toward the light sensing device.

11. The optical information recording and reproducing apparatus according to claim 9, wherein the spatial light modulator is capable of modulation setup, so that each of the pixels has a constant transmittance to the light sensing device.

* * * * *